US012643767B2

(12) United States Patent
Kattainen et al.

(10) Patent No.: US 12,643,767 B2
(45) Date of Patent: Jun. 2, 2026

(54) ELEVATOR COMMUNICATION SYSTEM

(71) Applicant: KONE Corporation, Helsinki (FI)

(72) Inventors: Ari Kattainen, Helsinki (FI); Ferenc Staengler, Helsinki (FI); Juha-Matti Aitamurto, Helsinki (FI); Gergely Huszak, Helsinki (FI)

(73) Assignee: KONE CORPORATION, Helsinki (FI)

( * ) Notice: Subject to any disclaimer, the term of this patent is extended or adjusted under 35 U.S.C. 154(b) by 912 days.

(21) Appl. No.: 17/959,818

(22) Filed: Oct. 4, 2022

(65) Prior Publication Data

US 2023/0027318 A1 Jan. 26, 2023

Related U.S. Application Data

(63) Continuation of application No. PCT/FI2021/050005, filed on Jan. 4, 2021.

(30) Foreign Application Priority Data

Apr. 30, 2020 (EP) ..................................... 20172438
Oct. 21, 2020 (EP) ..................................... 20203069

(51) Int. Cl.
B66B 1/34 (2006.01)
B66B 1/24 (2006.01)
(Continued)

(52) U.S. Cl.
CPC ............ B66B 1/343 (2013.01); B66B 1/2466 (2013.01); B66B 1/3453 (2013.01); (Continued)

(58) Field of Classification Search
CPC ..... B66B 1/343; B66B 1/2466; B66B 1/3453; B66B 1/3461; B66B 5/0031; B66B 13/22; (Continued)

(56) References Cited

U.S. PATENT DOCUMENTS 6,973,029 B1 12/2005 Jantzen
2015/0090534 A1 4/2015 Finschi
(Continued)

FOREIGN PATENT DOCUMENTS

CN 203740940 U * 7/2014
EP 3 651 419 A1 5/2020

OTHER PUBLICATIONS

International Search Report for PCT/FI2021/050005 mailed on Mar. 30, 2021.
(Continued)

*Primary Examiner* — Bickey Dhakal
(74) *Attorney, Agent, or Firm* — Birch, Stewart, Kolasch & Birch, LLP

(57) ABSTRACT

An elevator communication system includes a first elevator controller; a second elevator controller; and a first ethernet bus portion connected to the first elevator controller, the first ethernet bus portion having sequential bus segments interconnected by at least one switch. The first ethernet bus portion is arranged in a first elevator shaft. A second ethernet bus portion is connected to the second elevator controller and includes sequential bus segments interconnected by at least one switch. The second ethernet bus portion is arranged in a second elevator shaft. A switch of the first ethernet bus portion and a switch of the second ethernet bus portion are interconnected to enable data transmission between the switch of the first ethernet bus portion and the switch of the second ethernet bus portion. The first elevator controller is communicatively connected to the second elevator controller.

16 Claims, 5 Drawing Sheets

(51) Int. Cl.

| | |
|---|---|
| *B66B 1/46* | (2006.01) |
| *B66B 5/00* | (2006.01) |
| *B66B 13/22* | (2006.01) |
| *H04L 12/40* | (2006.01) |

(52) U.S. Cl.
CPC ............ *B66B 1/3461* (2013.01); *B66B 1/468* (2013.01); *B66B 5/0031* (2013.01); *B66B 13/22* (2013.01); *H04L 12/40182* (2013.01); *H04L 12/40195* (2013.01); *B66B 2201/30* (2013.01)

(58) Field of Classification Search
CPC ........... B66B 2201/30; H04L 12/40182; H04L 12/40195; H04L 2012/40267
See application file for complete search history.

(56) References Cited

U.S. PATENT DOCUMENTS

| | | | | |
|---|---|---|---|---|
| 2016/0036626 A1* | 2/2016 | Bale | ................... | H04L 41/0663 |
| | | | | 370/242 |
| 2020/0079619 A1 | 3/2020 | Thum et al. | | |

OTHER PUBLICATIONS

Written Opinion of the International Searching Authority for PCT/FI2021/050005 mailed on Mar. 30, 2021.

* cited by examiner

ELEVATOR COMMUNICATION SYSTEM

CROSS REFERENCE TO RELATED APPLICATIONS

This application is a Continuation of PCT International Application No. PCT/FI2021/050005, filed on Jan. 4, 2021, which claims priority under 35 U.S.C. 119 (a) to patent application No. 20172438.2, filed in the Europe on Apr. 30, 2020 and patent application Ser. No. 20/203,069.8, filed in the Europe on Oct. 21, 2020, all of which are hereby expressly incorporated by reference into the present application.

TECHNICAL FIELD

The present application relates to the field of elevator communication systems.

BACKGROUND

In modern elevator system, more and more data is sent and received by different entities of an elevator system. For example, an elevator controller may receive information from call buttons and then control an elevator drive to serve calls, or the elevator controller may receive information from a safety circuit and then based on this information control one or more entities of the elevator system. These are only some possible examples of situations where information is received and/or sent within an elevator system.

It is characteristic for the modern elevator systems that an elevator system may comprise multiple different internal data transmission solutions. This may mean that multiple different protocol stacks and multiple different physical layers may be used simultaneously. The use of multiple different internal data transmission solutions may result in a complicated and inefficient solution.

Further, a redundant safety bus system may be implemented using, for example, a CAN protocol or with RS485 time triggered protocol (TTS). It has duplicated communication channels, both with the same structure and same data communicated. In this solution two parallel communication channels are needed for safety reasons. These techniques, however, cannot be used when an elevator communication system uses, for example, an ethernet bus based communication.

Thus, it would be beneficial to have a solution that would alleviate at least one of these drawbacks.

SUMMARY

According to a first aspect, there is provided an elevator communication system comprising a first elevator controller; a second elevator controller; a first ethernet bus portion connected to the first elevator controller, the first ethernet bus portion comprising sequential bus segments interconnected by at least one switch, wherein the first ethernet bus portion is arranged in a first elevator shaft; a second ethernet bus portion connected to the second elevator controller, the second ethernet bus portion comprising sequential bus segments interconnected by at least one switch, wherein the second ethernet bus portion is arranged in a second elevator shaft; and wherein a switch of the first ethernet bus portion and a switch of the second ethernet bus portion are interconnected to enable data transmission between the switch of the first ethernet bus portion and the switch of the second ethernet bus portion; and wherein the first elevator controller is communicatively connected to the second elevator controller to enable communication between them in case of a communication failure of the first ethernet bus portion and/or the second ethernet bus portion. This enables a solution in which communication capability between elements in the elevator communication system is maintained even if one of the first or second ethernet bus portions is faulty.

In an implementation form of the first aspect, the switch of the first ethernet bus portion comprises a switch at the end of the first ethernet bus portion and the switch of the second ethernet bus portion comprises a switch at the end of the second ethernet bus portion.

In an implementation form of the first aspect, the first ethernet bus portion and the second ethernet bus portion comprises a point-to-point ethernet section.

In an implementation form of the first aspect, the elevator communication system further comprises an ethernet bus segment connected between two switches of the first ethernet bus portion.

In an implementation form of the first aspect, the elevator communication system comprises an ethernet bus segment connected between two switches of the second ethernet bus portion.

In an implementation form of the first aspect, the elevator communication system comprises a shared segment between to the first ethernet bus segment and the second ethernet bus segment.

In an implementation form of the first aspect, the elevator communication system comprises a shared landing segment between a switch of the first ethernet bus portion and a switch of the second ethernet bus portion.

In an implementation form of the first aspect, the elevator communication system a landing segment connected to at least one of a switch of the first ethernet bus portion and a switch of the second ethernet bus portion.

In an implementation form of the first aspect, one of the first and the second elevator controllers is configured as a group controller for elevator cars associated with the first and the second elevator shafts.

According to a first aspect, there is provided an elevator system comprising the elevator communication system of the first aspect.

In an implementation form of the second aspect, the elevator system comprises at least two elevator cars configured to move in tandem or independently in same elevator shaft.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The following description illustrates an elevator communication system that comprises a first elevator controller; a second elevator controller; a first ethernet bus portion connected to the first elevator controller, the first ethernet bus portion comprising sequential bus segments interconnected by at least one switch, wherein the first ethernet bus portion is arranged in a first elevator shaft; a second ethernet bus portion connected to the second elevator controller, the second ethernet bus portion comprising sequential bus segments interconnected by at least one switch, wherein the second ethernet bus portion is arranged in a second elevator shaft; and wherein a switch of the first ethernet bus portion and a switch of the second ethernet bus portion are interconnected to enable data transmission between the switch of the first ethernet bus portion and the switch of the second ethernet bus portion; and wherein the first elevator controller is communicatively connected to the second elevator controller to enable communication between them in case of a communication failure of the first ethernet bus portion and/or the second ethernet bus portion. The illustrated solution may enable, for example, a solution with an improved reliability and availability of an all-ethernet elevator communication system. Further, elevator service and data communication in the elevator communication system does not have to be interrupted in case of a single failure in the elevator communication system.

Further, the term "communicatively connected" used herein may mean that an element may be directly connected to another element, node or bus or that it may be indirectly connected to the another element, node or bus via a connecting element, node or bus.

In an example embodiment, the various embodiments discussed below may be used in an elevator system comprising at least one elevator that is suitable and may be used for transferring passengers between landing floors of a building in response to service requests. In another example embodiment, the various embodiments discussed below may be used in an elevator system comprising at least one elevator that is suitable and may be used for automated transferring of passengers between landings in response to service requests.

Figure 1A:
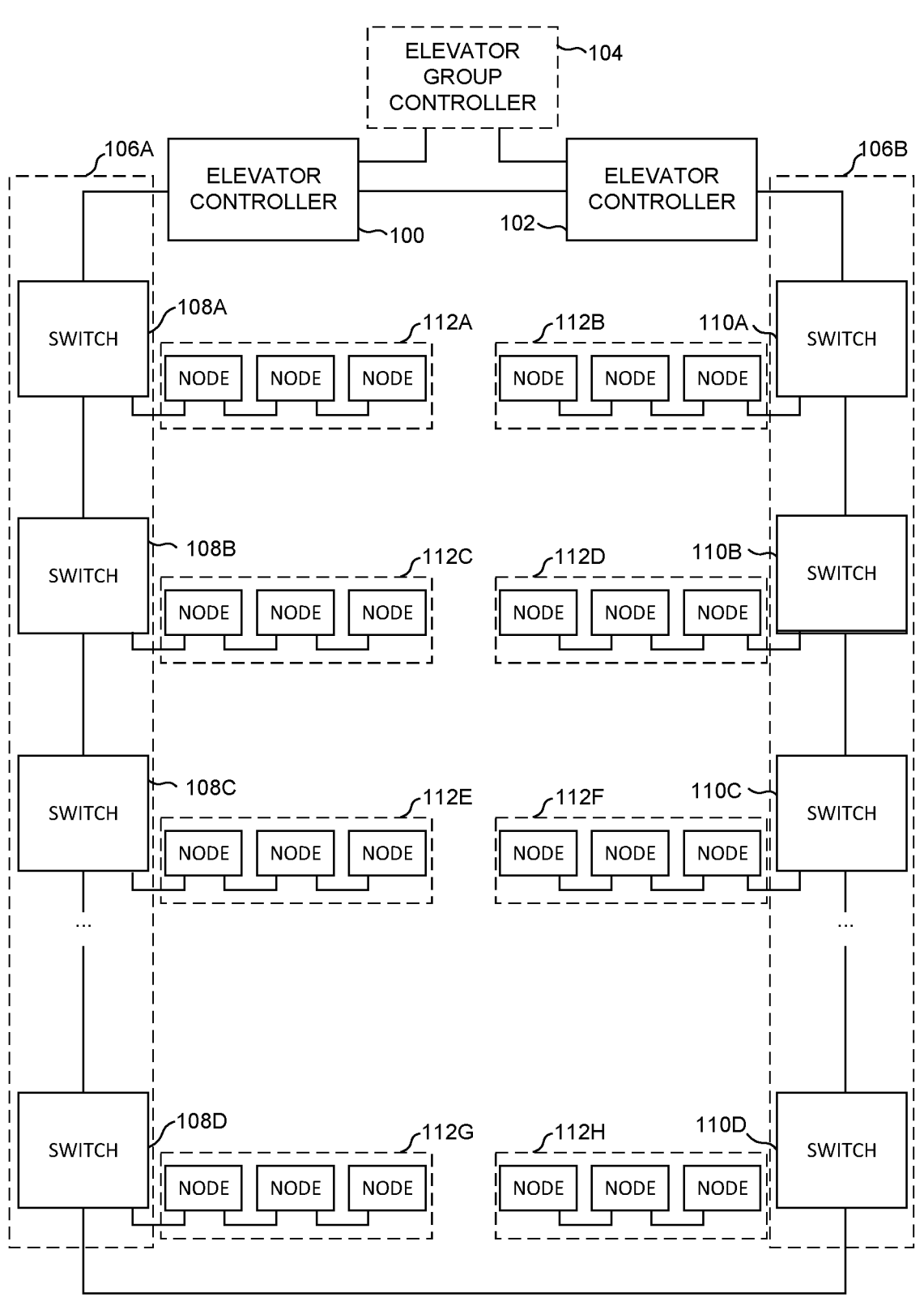
FIG. 1A illustrates an elevator communication system according to an example embodiment.

FIG. 1A illustrates an elevator communication system according to an example embodiment. The elevator communication system comprises a first elevator controller 100 that is communicatively connected to a second elevator controller. The elevator communication system may further comprise an elevator group controller 104 communicatively connected to both elevator controllers 100, 102. In another example embodiment, the elevator group controller 104 may be integrated into the elevator controller 100 or 102 such that the elevator controller 100 or 102 runs group controller software to implement group controller functions.

The elevator communication system may comprise a first ethernet bus portion 106A connected to the first elevator controller 100 and a second ethernet bus portion 106B connected to the second elevator controller 102. The first ethernet bus portion 106A may comprise sequential bus segments interconnected by at least one switch 108A-108D or other interconnecting unit. The first ethernet bus portion 106A may extend in a first elevator shaft. Similarly, the second ethernet bus portion 106B may comprise sequential bus segments interconnected by at least one switch 110A-

110D or other interconnecting unit. The second ethernet bus portion 106B may extend in a second elevator shaft.

The first ethernet bus portion 106A may comprise a point-to-point ethernet bus and at least one connecting unit 108A-108D interlinked to each other. The second ethernet bus portion 106B may comprise a point-to-point ethernet bus and at least one connecting unit 110A-110D interlinked to each other. The connecting units 108A-108D and 110A-110D may refer, for example, to a switch. Further, the point-to-point ethernet bus may be, for example, a 100BASE-TX or 10BASET1L point-to-point ethernet bus.

The switch 108D at the end of the first ethernet bus portion 106A and the switch 110D at the end of the second ethernet bus portion 106B are interconnected to enable data transmission between the switch 108D at the end of the first ethernet bus portion 106A and the switch 110D at the end of the second ethernet bus portion 106B.

In an example embodiment, the elevator communication system may comprise at least one landing segment 112A-112H communicatively connected to a corresponding switch 108A-108D, 110A-110D.

The illustrated solution may enable, for example, a solution with an improved reliability and availability of an all-ethernet elevator communication system. Further, elevator service and data communication in the elevator communication system does not have to be interrupted in case of a single failure in the elevator communication system.

Figure 1B:
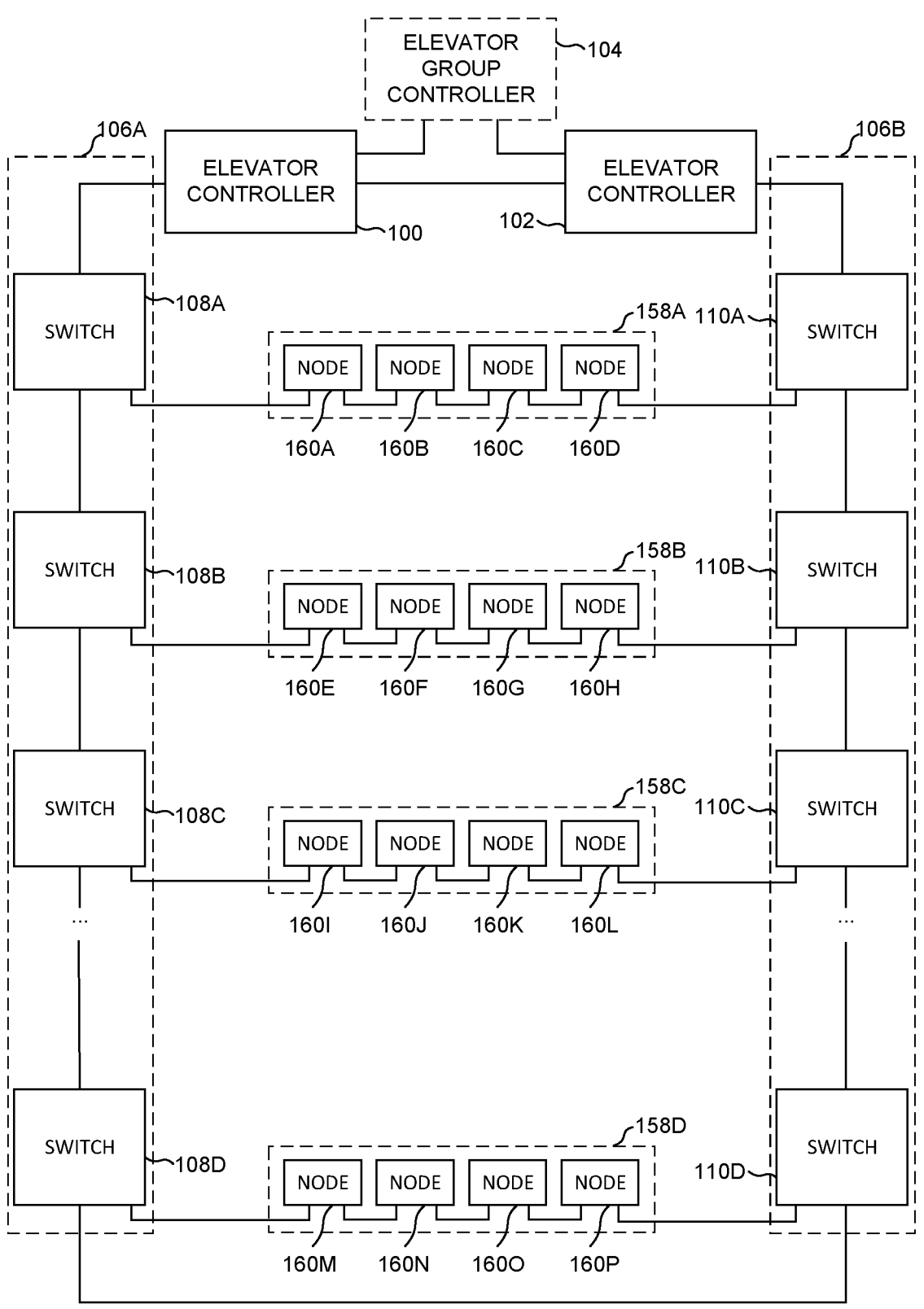
FIG. 1B illustrates an elevator communication system according to another example embodiment.

FIG. 1B illustrates an elevator communication system according to an example embodiment. The elevator communication system comprises a first elevator controller 100 that is communicatively connected to a second elevator controller. The elevator communication system may further comprise an elevator group controller 104 communicatively connected to both elevator controllers 100, 102. In another example embodiment, the elevator group controller 104 may be integrated into the elevator controller 100 or 102 such that the elevator controller 100 or 102 runs group controller software to implement group controller functions.

The elevator communication system may comprise a first ethernet bus portion 106A connected to the first elevator controller 100 and a second ethernet bus portion 106B connected to the second elevator controller 102. The first ethernet bus portion 106A may comprise sequential bus segments interconnected by at least one switch 108A-108D or other interconnecting unit. The first ethernet bus portion 106A may extend in a first elevator shaft. Similarly, the second ethernet bus portion 106B may comprise sequential bus segments interconnected by at least one switch 110A-110D or other interconnecting unit. The second ethernet bus portion 106B may extend in a second elevator shaft.

The first ethernet bus portion 106A may comprise a point-to-point ethernet bus and at least one connecting unit 108A-108D interlinked to each other. The second ethernet bus portion 106B may comprise a point-to-point ethernet bus and at least one connecting unit 110A-110D interlinked to each other. The connecting units 108A-108D and 110A-110D may refer, for example, to a switch. Further, the point-to-point ethernet bus may be, for example, a 100BASE-TX or 10BASET1L point-to-point ethernet bus.

The switch 108D at the end of the first ethernet bus portion 106A and the switch 110D at the end of the second ethernet bus portion 106B may be interconnected to enable data transmission between the switch 108D at the end of the first ethernet bus portion 106A and the switch 110D at the end of the second ethernet bus portion 106B.

The elevator communication system may further comprise a shared ethernet bus segment 158A-158D communicatively connected to the first ethernet bus portion 106A and to the second ethernet bus portion 106B. One or more elevator system nodes 160A-160P may be connected to the shared ethernet bus segment 158A-158D. The shared ethernet bus segment 158A-158D may be connected to a switch 108A-108D of the first ethernet bus portion 106A and to a switch 110A-110D of the second ethernet bus portion 106B.

In another example embodiment, the switch 108D at the end of the first ethernet bus portion 106A and the switch 110D at the end of the second ethernet bus portion 106B may not necessarily be interconnected. Instead, the interconnection may be arranged between any other switch pair of the first ethernet bus portion 106A and the second ethernet bus portion 106B.

As can be seen from FIG. 1B, each node in the elevator communication system may be reachable via at least two different routes. For example, if the shared ethernet bus segment 158A becomes faulty between the node 160D and the switch 110A of the second ethernet bus portion 106B, communication is still enabled for the node 160D via the switch 108A of the first ethernet bus portion 106A.

The illustrated solution may enable, for example, a solution with an improved reliability and availability of an all-ethernet elevator communication system. Further, elevator service and data communication in the elevator communication system does not have to be interrupted in case of a single failure in the elevator communication system.

Figure 1C:
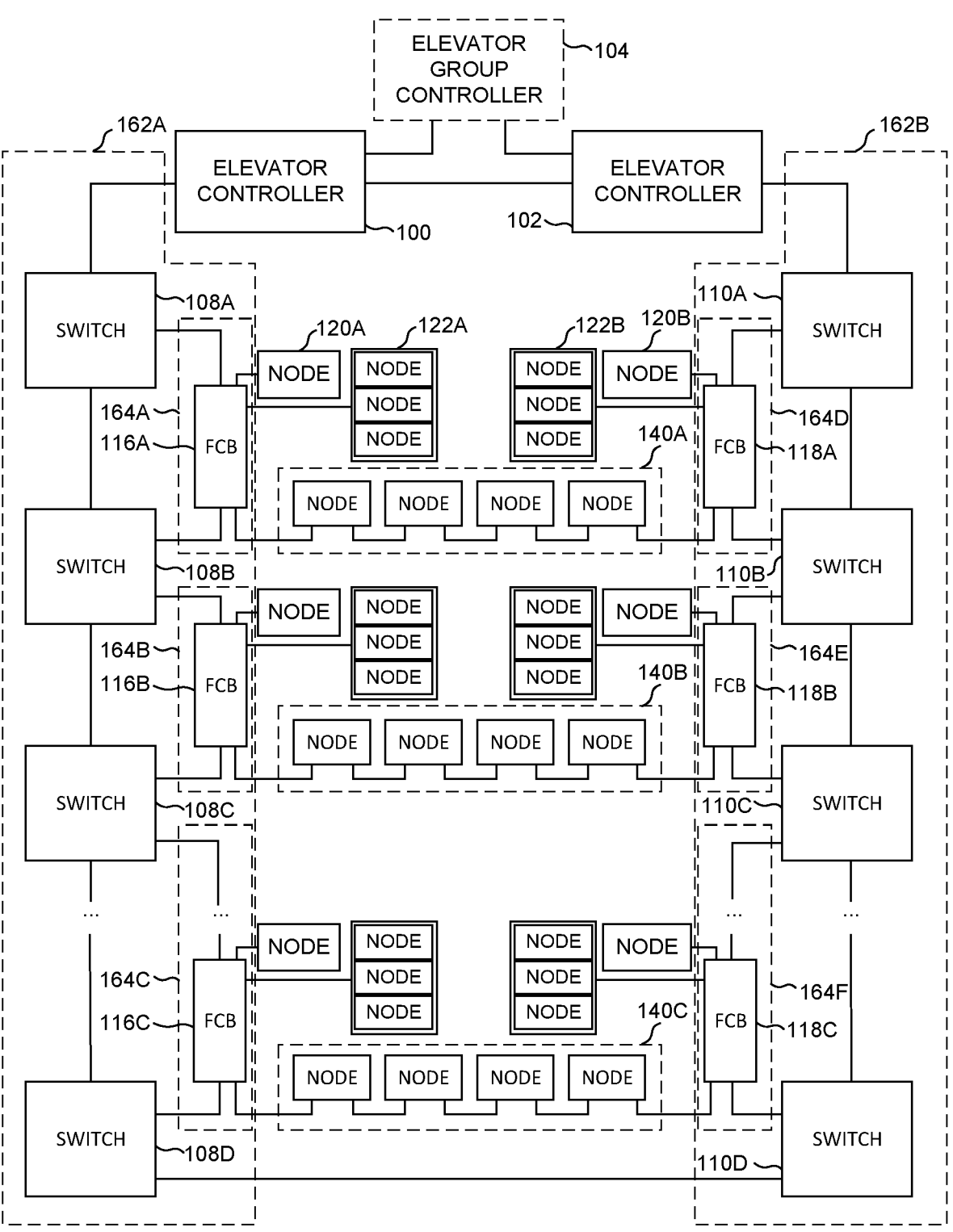
FIG. 1C illustrates an elevator communication system according to another example embodiment.

FIG. 1C illustrates an elevator communication system according to an example embodiment. The elevator communication system comprises a first elevator controller 100 that is communicatively connected to a second elevator controller. The elevator communication system may further comprise an elevator group controller 104 communicatively connected to both elevator controllers 100, 102. In another example embodiment, the elevator group controller 104 may be integrated into the elevator controller 100 or 102 such that the elevator controller 100 or 102 runs group controller software to implement group controller functions.

The elevator communication system may comprise a first ethernet bus portion 162A connected to the first elevator controller 100 and a second ethernet bus portion 162B connected to the second elevator controller 102. The first ethernet bus portion 162A may comprise sequential bus segments interconnected by at least one switch 108A-108D or other interconnecting unit. The first ethernet bus portion 162A may extend in a first elevator shaft. Similarly, the second ethernet bus portion 162B may comprise sequential bus segments interconnected by at least one switch 110A-110D or other interconnecting unit. The second ethernet bus portion 162B may extend in a second elevator shaft.

The first ethernet bus portion 106A may comprise a point-to-point ethernet bus and at least one connecting unit 108A-108D interlinked to each other. The second ethernet bus portion 106B may comprise a point-to-point ethernet bus and at least one connecting unit 110A-110D interlinked to each other. The connecting units 108A-108D and 110A-110D may refer, for example, to a switch. Further, the point-to-point ethernet bus may be, for example, a 100BASE-TX or 10BASET1L point-to-point ethernet bus.

The switch 108D at the end of the first ethernet bus portion 106A and the switch 110D at the end of the second ethernet bus portion 106B may be interconnected to enable data transmission between the switch 108D at the end of the first ethernet bus portion 106A and the switch 110D at the end of the second ethernet bus portion 106B.

The sequential bus segments of the first ethernet bus section 162A may comprise a point-to-point ethernet bus segment between a first switch 108A and a second switch 108B and a first multi-drop ethernet bus segment 164A between the first switch 108A and the second switch 108B. Similarly, the sequential bus segments of the second ethernet bus section 162B may comprise a point-to-point ethernet bus segment between a third switch 110A and a fourth switch 110B and a second multi-drop ethernet bus segment 164D between the third switch 110A and the fourth switch 110B. The same structure associated with the multidrop ethernet bus segment between two subsequent switches may be configured also for the other switches in the first ethernet bus section 162A and the second ethernet bus section 162B.

The point-to-point ethernet bus may be, for example, a 100BASE-TX or 10BASET1L point-to-point ethernet bus. The multi-drop ethernet bus segment 164A-164D may comprise, for example, a 10BASE-T1S multi-drop ethernet bus.

A node 116A may be arranged in the first multi-drop ethernet bus segment 164A and a node 118A may arranged in the second multi-drop ethernet bus segment 164D. The nodes 116A, 118A may refer, for example, to a floor control board configured at each floor. The elevator communication system may further comprise a shared ethernet bus segment 140A configured between nodes 116A and 118A. A similar arrangement comprising shared ethernet bus segments 140B, 140C may be configured between nodes 116B and 118B and nodes 116C and 118C.

One or more nodes 120A, 122A, 120B, 122B may be connected directly to the nodes 116A, 118A, for example, a display, one or more call buttons, one or more key switches, one or more on/off indicators etc. Further, one of more of the illustrated nodes may be configured to interface with at least one of an elevator fixture, an elevator sensor, an elevator safety device, and an elevator control device.

Further, one or more nodes illustrated in FIG. 1C may send information from sensors or fixtures to the elevator controller 100, 102 and receive information therefrom to control, for example, actuators configure fixtures etc. One or more nodes illustrated in FIG. 1C may be safety nodes in accordance with IEC61508 SIL level 3, having a safety processing unit and a separate communication controller. The safety nodes may be configured to interface with elevator safety devices, such as safety sensors or safety contacts indicating elevator safety, e.g. landing door contacts, door lock contacts, contact of overspeed governor, buffer contacts etc.

As illustrated in FIG. 1C, the nodes 116A-116C, 118A-118C may comprise or may act as a switch to the multi-drop segments 140A-140C, i.e. landing segments. This may enable a simple solution for adding new elevator system nodes to the elevator communication system. This may also enable a solution in which a single elevator system node may act as a switch or a repeater to another multi-drop ethernet bus segment to which nearby elevator system elements, for example, a call button or buttons, a display or displays, a destination operating panel or panels, a camera or cameras, a voice intercom device etc.

Further, as can be seen from FIG. 1C, each important node in the elevator communication system is reachable via at least two different routes. Further, the switches 108D, 110D at the end of the first ethernet bus section 162A and the second ethernet bus section 162B are connected to each other, for example, via a point-to-point ethernet bus. The illustrated solution may enable, for example, a solution with an improved reliability and availability of an all-ethernet elevator communication system. Further, elevator service and data communication in the elevator communication system does not have to be interrupted in case of a single failure in the elevator communication system.

Figure 1D:
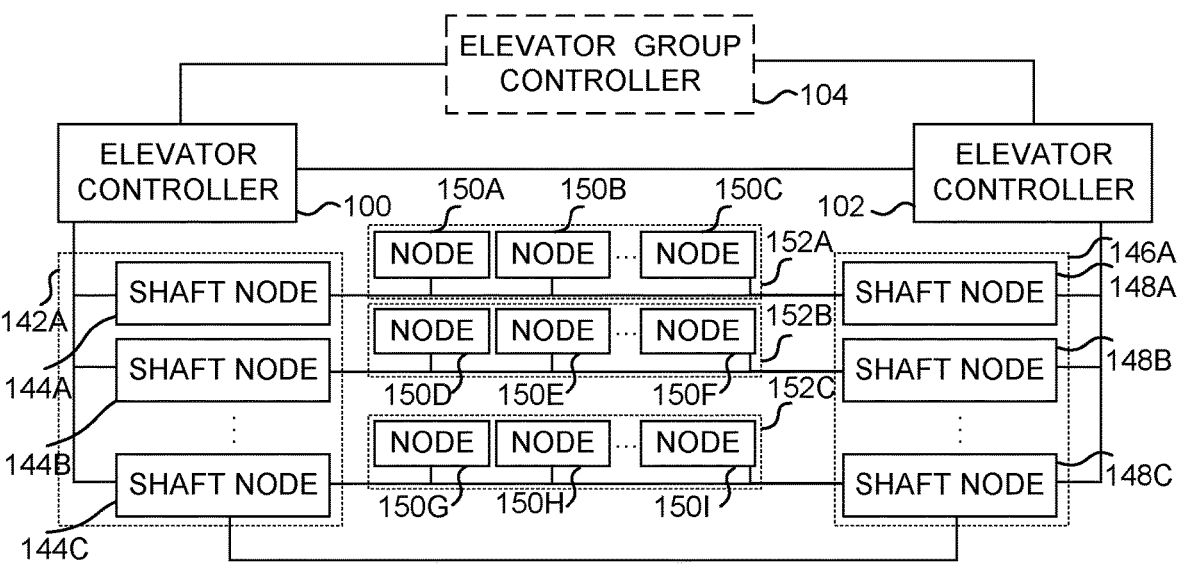
FIG. 1D illustrates an elevator communication system according to another example embodiment.

FIG. 1D illustrates an elevator communication system according to an example embodiment. The elevator communication system comprises a first elevator controller 100 that is communicatively connected to a second elevator controller. The elevator communication system may further comprise an elevator group controller 104 communicatively connected to both elevator controllers 100, 102. In another example embodiment, the elevator group controller 104 may be integrated into the elevator controller 100 or 102 such that the elevator controller 100 or 102 runs group controller software to implement group controller functions.

The elevator communication system may comprise a first ethernet bus portion 142A connected to the first elevator controller 100 and a second ethernet bus portion 146A connected to the second elevator controller 102. The first ethernet bus portion 142A may comprise a first multi-drop ethernet bus segment connected to the elevator controller 100 and the second ethernet bus portion 146A may comprise a second multi-drop ethernet bus segment connected to the elevator controller 102. The multi-drop ethernet bus segment 142A, 146A may comprise, for example, a 10BASE-T1S multi-drop ethernet bus.

The first ethernet bus portion 142A may comprise one or more nodes, for example, shaft nodes 144A-144C. Similarly, the second ethernet bus portion 146A may comprise one or more nodes, for example, shaft nodes 144A-144C. Similarly, the second ethernet bus portion 146A may comprise one or more nodes, for example, shaft nodes 148A-148C. The first ethernet bus portion 142A may extend in a first elevator shaft and the second ethernet bus portion 146A may extend in a second elevator shaft. In an example embodiment, a single shaft node may be arranged in each floor.

The shaft node 144C at the end of the first ethernet bus portion 142A may comprise a switch which is connected to a switch comprised in the shaft node 148C at the end of the second ethernet bus portion 146A to enable data transmission between the switches.

The elevator communication system may further comprise a shared ethernet bus segment 152A-152C communicatively connected to the first ethernet bus portion 142A and to the second ethernet bus portion 146A. One or more elevator system nodes 150A-150I may be connected to the shared ethernet bus segment 150A-150C. The shared ethernet bus segments 150A-150C may be connected to the shaft nodes 144A-144C, 148A-148C as illustrated in FIG. 1D. The shared ethernet bus segment 152A-152C may comprise a multi-drop ethernet bus segment comprising, for example, a 10BASE-T1S multi-drop ethernet bus.

As illustrated in FIG. 1D, the shaft nodes 144A-144C, 148A-148C may comprise or may act as a switch to the shaft multi-drop segments 152A-152C, i.e. landing segments. This may enable a simple solution for adding new elevator system nodes to the elevator communication system. This may also enable a solution in which a single elevator system node may act as a switch or a repeater to another multi-drop ethernet bus segment to which nearby elevator system elements, for example, a call button or buttons, a display or displays, a destination operating panel or panels, a camera or cameras, a voice intercom device etc.

The illustrated solution may enable, for example, a solution with an improved reliability and availability of an all-ethernet elevator communication system. Further, elevator service and data communication in the elevator communication system does not have to be interrupted in case of a single failure in the elevator communication system.

Figure 1E:
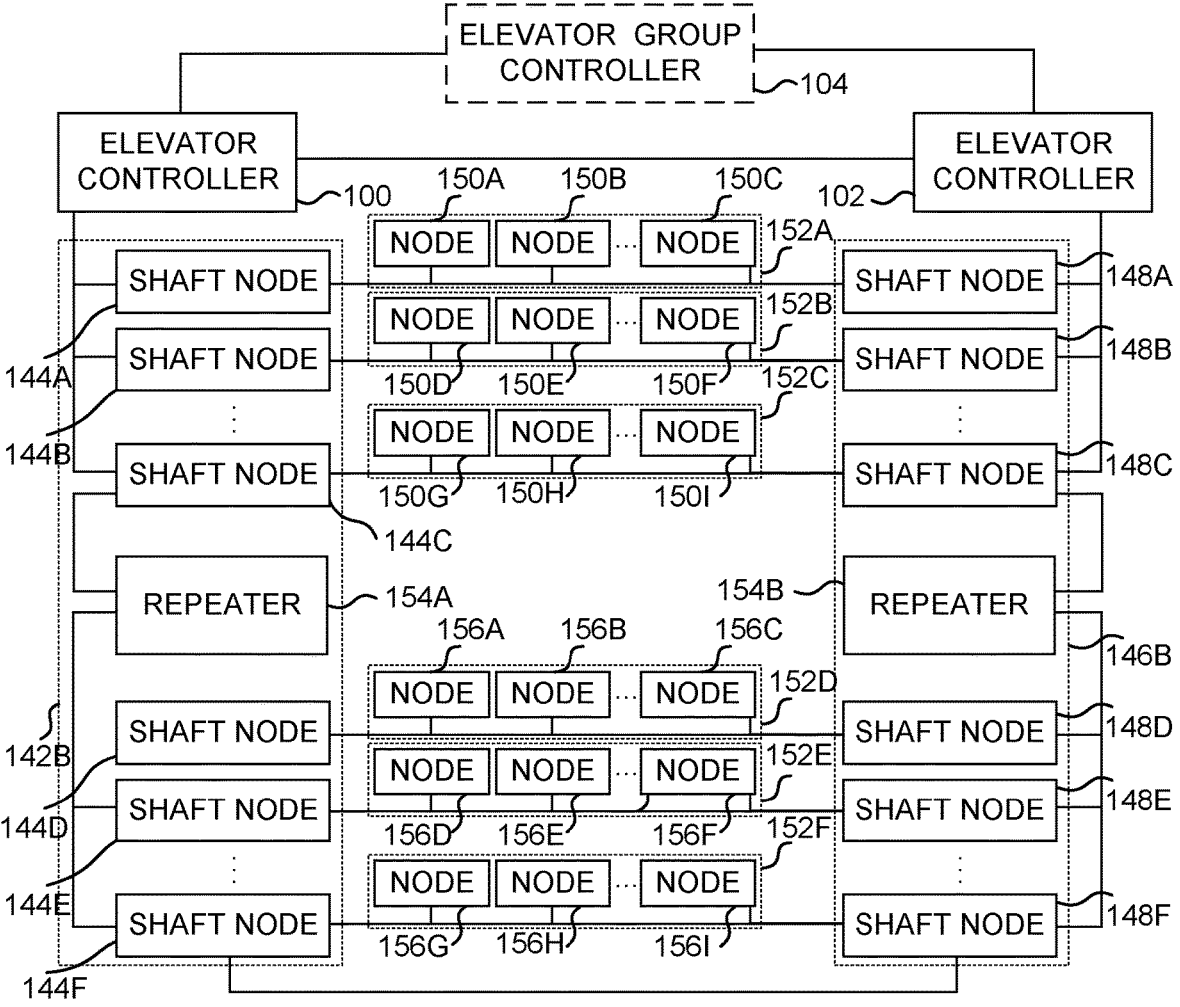
FIG. 1E illustrates an elevator communication system according to another example embodiment.

FIG. 1E illustrates an elevator communication system according to another example embodiment. The embodiment illustrated in FIG. 1E comprises all the elements discussed in relation to FIG. 1D. Additionally, FIG. 1E illustrates a repeater 154A that connects another shaft multi-drop ethernet segment 142B to the multi-drop ethernet segment 142A. As illustrated in FIG. 1E, shared landing segments 152D-152F are connected to the shaft nodes 144D-144F, 148D-148F similarly than was discussed above in relation to FIG. 1D. By using one more repeaters, the physical reach of the multi-drop ethernet bus segments 142A, 146A can be extended.

The shaft node 144F at the end of the first ethernet bus portion 142B may comprise a switch which is connected to a switch comprised in the shaft node 148F at the end of the second ethernet bus portion 146B to enable data transmission between the switches.

Although not illustrated in FIGS. 1A-1E, the elevator communication system may further comprise a point-to-point ethernet bus that provides a connection from the elevator controller 100, 102 to an elevator car and to various elements associated with the elevator car. The elevator car may comprise a connecting unit, for example, a switch, to which one or more elevator car nodes may be connected. In an example embodiment, the elevator car nodes can be connected to the connecting unit via a multi-drop ethernet bus segment, thus constituting an elevator car segment. In an example embodiment, the point-to-point-ethernet bus is located in the travelling cable of the elevator car.

The elevator communication system discussed above may be implemented in an elevator system comprising one or more elevator shafts. Further, in an example embodiment, the elevator system may comprise at least two elevator cars configured to move in tandem or independently in a same elevator shaft.

In an example embodiment, the elevator communication system illustrated in any of FIGS. 1A-1E may be applied in a multicar elevator system. In the multicar elevator system, there are a plurality of elevator cars adapted to move along a common circular path sequentially, in the same direction of circulation. Cars will move upwards along a first shaft and downwards along a second, parallel shaft. Transfer from one shaft to another will take place in a horizontal direction via transfer stations, disposed at least within top and bottom end terminals of the shaft. In some embodiments, propulsion force for the elevator cars may be provided by a linear motor. Each elevator car may have a mover co-acting with a common stator beam which allows the elevator cars to be individually controllable. A first elevator controller may be disposed in a first shaft or associated therewith. A second elevator controller may be disposed in a second shaft or associated therewith. The second elevator controller may be communicatively connected to the first elevator controller. A first ethernet bus portion may be connected to the first elevator controller, and it may extend in the first shaft. A second ethernet bus portion may be connected to the second elevator controller, and it may extend in the second shaft. At least one elevator system node may be communicatively connected to the first elevator controller via the first ethernet bus portion and to the second elevator controller via the second ethernet bus portion. The first elevator controller and the second elevator controller may be configured to control the multicar elevator system. Thus, they may comprise altogether, or both separately, the required elevator control functions.

Figure 2:
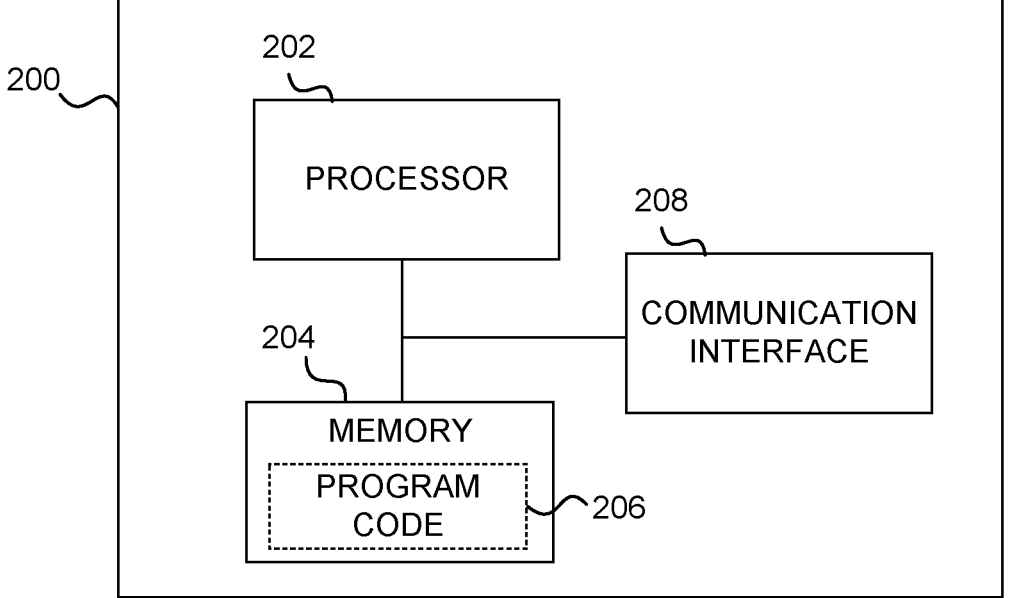
FIG. 2 illustrates an apparatus according to an example embodiment.

FIG. 2 illustrates an apparatus 200 that may operate as a node or an elevator controller 100, 102 illustrated in any of FIGS. 1A-1E according to an example embodiment. The apparatus 200 may comprise at least one processor 202. The apparatus 200 may further comprise at least one memory 204. The memory 204 may comprise program code 206 which, when executed by the processor 202 causes the apparatus 200 to perform at least one example embodiment. The exemplary embodiments and aspects of the subject-matter can be included within any suitable device, for example, including, servers, elevator controllers, worksta-tions, capable of performing the processes of the exemplary embodiments. The exemplary embodiments may also store information relating to various processes described herein. Although the controller 300 is illustrated as a single device it is appreciated that, wherever applicable, functions of the controller 300 may be distributed to a plurality of devices.

Example embodiments may be implemented in software, hardware, application logic or a combination of software, hardware and application logic. The example embodiments can store information relating to various methods described herein. This information can be stored in one or more memories 204, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

The processor 202 may comprise one or more general purpose processors, microprocessors, digital signal proces-sors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodi-ments may be implemented by the preparation of applica-tion-specific integrated circuits or by interconnecting an appropriate network of conventional component circuits, as will be appreciated by those skilled in the electrical art(s).

Thus, the examples are not limited to any specific com-bination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if pro-cessing is distributed) of the processing performed in imple-menting the example embodiments. Computer code devices of the examples may include any suitable interpretable or executable code mechanism, including but not limited to scripts, interpretable programs, dynamic link libraries (DLLs), Java classes and applets, complete executable pro-grams, and the like.

As stated above, the components of the example embodi-ments may include computer readable medium or memories 204 for holding instructions programmed according to the teachings and for holding data structures, tables, records, and/or other data described herein. In an example embodi-ment, the application logic, software or an instruction set is maintained on any one of various conventional computer-readable media. In the context of this document, a "com-puter-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in pro-viding instructions to a processor for execution. Such a medium can take many forms, including but not limited to, non-volatile media, volatile media, transmission media, and the like.

The apparatus 200 may comprise a communication inter-face 208 configured to enable the apparatus 200 to transmit and/or receive information, to/from other apparatuses.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substan-tially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice.

The applicant hereby discloses in isolation each indi-vidual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the dis-closed aspects/embodiments may consist of any such indi-vidual feature or combination of features. In view of the foregoing description it will be evident to a person skilled in the art that various modifications may be made within the scope of the disclosure.

The invention claimed is:

1. An elevator communication system, comprising:
a first elevator controller;
a second elevator controller;
a first ethernet bus portion connected to the first elevator controller, the first ethernet bus portion comprising sequential bus segments interconnected by at least one switch including a first switch, wherein the first ether-net bus portion is arranged in a first elevator shaft;
a second ethernet bus portion connected to the second elevator controller, the second ethernet bus portion comprising sequential bus segments interconnected by at least one switch including a second switch, wherein the second ethernet bus portion is arranged in a second elevator shaft; and
wherein the first switch of the first ethernet bus portion and the second switch of the second ethernet bus portion are interconnected to enable data transmission between the switch of the first ethernet bus portion and the switch of the second ethernet bus portion;

wherein the first elevator controller is communicatively connected to the second elevator controller to enable communication between them in case of a communication failure of the first ethernet bus portion and/or the second ethernet bus portion; and wherein the first switch of the first ethernet bus portion is at an end of the first ethernet bus portion and the second switch of the second ethernet bus portion is at an end of the second ethernet bus portion.

2. The elevator system of claim 1, wherein the first ethernet bus portion and the second ethernet bus portion comprises a point-to-point ethernet section.

3. The elevator communication system of claim 2, further comprising an ethernet bus segment connected between two switches of the first ethernet bus portion.

4. The elevator communication system of claim 2, further comprising a shared landing segment between the first switch of the first ethernet bus portion and the second switch of the second ethernet bus portion.

5. The elevator communication system of claim 2, further comprising a landing segment connected to at least one of the first switch of the first ethernet bus portion and the second switch of the second ethernet bus portion.

6. The elevator communication system according to claim 2, wherein one of the first and the second elevator controllers is configured as a group controller for elevator cars associated with the first and the second elevator shafts.

7. An elevator communication system, comprising:
a first elevator controller;
a second elevator controller;
a first ethernet bus portion connected to the first elevator controller, the first ethernet bus portion comprising sequential bus segments interconnected by at least one switch including a first switch, wherein the first ethernet bus portion is arranged in a first elevator shaft;
a second ethernet bus portion connected to the second elevator controller, the second ethernet bus portion comprising sequential bus segments interconnected by at least one switch including a second switch, wherein the second ethernet bus portion is arranged in a second elevator shaft; and
an ethernet bus segment connected between two switches of the first ethernet bus portion,
wherein the first switch of the first ethernet bus portion and the second switch of the second ethernet bus portion are interconnected to enable data transmission between the switch of the first ethernet bus portion and the switch of the second ethernet bus portion; and
wherein the first elevator controller is communicatively connected to the second elevator controller to enable communication between them in case of a communication failure of the first ethernet bus portion and/or the second ethernet bus portion.

8. The elevator communication system of claim 7, further comprising an ethernet bus segment connected between two switches of the second ethernet bus portion.

9. The elevator communication system of claim 8, further comprising a shared segment between to the first ethernet bus portion and the second ethernet bus portion.

10. An elevator communication system, comprising:
a first elevator controller:
a second elevator controller:
a first ethernet bus portion connected to the first elevator controller, the first ethernet bus portion comprising sequential bus segments interconnected by at least one switch including a first switch, wherein the first ethernet bus portion is arranged in a first elevator shaft;

a second ethernet bus portion connected to the second elevator controller, the second ethernet bus portion comprising sequential bus segments interconnected by at least one switch including a second switch, wherein the second ethernet bus portion is arranged in a second elevator shaft; and further comprising a shared landing segment between the first switch of the first ethernet bus portion and the second switch of the second ethernet bus portion, wherein the first switch of the first ethernet bus portion and the second switch of the second ethernet bus portion are interconnected to enable data transmission between the switch of the first ethernet bus portion and the switch of the second ethernet bus portion; and wherein the first elevator controller is communicatively connected to the second elevator controller to enable communication between them in case of a communication failure of the first ethernet bus portion and/or the second ethernet bus portion.

11. An elevator communication system, comprising:
a first elevator controller;
a second elevator controller;
a first ethernet bus portion connected to the first elevator controller, the first ethernet bus portion comprising sequential bus segments interconnected by at least one switch including a first switch, wherein the first ethernet bus portion is arranged in a first elevator shaft;
a second ethernet bus portion connected to the second elevator controller, the second ethernet bus portion comprising sequential bus segments interconnected by at least one switch including a second switch, wherein the second ethernet bus portion is arranged in a second elevator shaft; and
a landing segment connected to at least one of the first switch of the first ethernet bus portion and the second switch of the second ethernet bus portion,
wherein the first switch of the first ethernet bus portion and the second switch of the second ethernet bus portion are interconnected to enable data transmission between the switch of the first ethernet bus portion and the switch of the second ethernet bus portion;
wherein the first elevator controller is communicatively connected to the second elevator controller to enable communication between them in case of a communication failure of the first ethernet bus portion and/or the second ethernet bus portion.

12. The elevator communication system according to claim 1, wherein one of the first and the second elevator controllers is configured as a group controller for elevator cars associated with the first and the second elevator shafts.

13. An elevator system comprising the elevator communication system of claim 1.

14. The elevator system of claim 13, comprising at least two elevator cars configured to move in tandem or independently in same elevator shaft.

15. The elevator communication system of claim 1, further comprising an ethernet bus segment connected between two switches of the first ethernet bus portion.

16. The elevator communication system of claim 1, further comprising a shared landing segment between a third switch included in the at least one switch of the first ethernet bus portion and a fourth switch included in the at least one switch of the second ethernet bus portion.

* * * * *